United States Patent [19]

Wang

[11] Patent Number: 4,852,675

[45] Date of Patent: Aug. 1, 1989

[54] APPARATUS FOR INTERMEDIATE TRANSMISSION OF SENSED OIL PRESSURE IN A SCALE

[76] Inventor: Hsug-Fang Wang, 129, Tuan-Chu Lane, Tuan-Chu Li, Chiayi City, Taiwan

[21] Appl. No.: 281,066

[22] Filed: Dec. 8, 1988

[51] Int. Cl.⁴ .......................... G01G 5/04; G01L 1/02; F01B 19/00; F16J 3/00
[52] U.S. Cl. ................................. 177/208; 73/862.58; 92/34; 92/42
[58] Field of Search ..................... 60/584; 92/13.2, 34, 92/42, 45, 164; 177/208, 209; 73/862.58

[56] References Cited

U.S. PATENT DOCUMENTS

| | | | |
|---|---|---|---|
| 1,382,081 | 6/1921 | Heiliger | 92/42 X |
| 3,162,335 | 12/1964 | Kogan et al. | 92/13.2 X |
| 4,002,216 | 1/1977 | Solow | 177/208 |
| 4,219,090 | 8/1980 | Dayton | 177/208 |

Primary Examiner—George H. Miller, Jr.
Attorney, Agent, or Firm—Cushman, Darby & Cushman

[57] ABSTRACT

A scale utilizing an oil pressure gauge for displaying the measured weight is disclosed. In the scale, there is an apparatus for intermediate transmission of sensed pressure representing the weight applied on the scale. The apparatus includes a bellows-shaped envelope having an open end and a sealed end and forming a chamber therein for containing hydraulic oil, a base member connected to the open end of the envelope and an air leakage member positioned on the sealed end of the envelope. There is an oil passage formed in the base member to enable the hydraulic oil in the envelope to flow out. An annular clamp is used for the connection of the base member and the envelope. A knob is connected to the air leakage member to block the air passage. The apparatus for intermediate transmission of sensed pressure may further include a plurality of rigid metal retainers outside of the envelope for preventing the same from overly deforming in a radial direction.

8 Claims, 3 Drawing Sheets

APPARATUS FOR INTERMEDIATE TRANSMISSION OF SENSED OIL PRESSURE IN A SCALE

BACKGROUND OF THE INVENTION

1. Field of the Invention

The present invention relates to an apparatus for intermediate transmission of the sensed pressure in a scale having an oil pressure gauge adopted therein for displaying a pressure reading corresponding to the weight of an object or a person.

2. Brief Description of the Preferred Embodiment

Scales are widely used for measuring the weight of an object or a person. The general requirements for a scale are application of the range of weight to be measured, accuracy in displaying the weight readings, linearity in responding to weight changes and simplicity in mechanical construction thereof. Many kinds of scales have been available in the past, such as electronic scales and scales with coil springs provided therein which serve as sensors of the weight, etc. A very popular scale for measuring the weight of a person is shown in FIGS. 1 and 2, which are a perspective view and a simplified elevational view thereof. The scale is composed of a base member A, a gauge D for displaying the weight readings, an assembly of levers B having four fulcrums E and a force exerting terminal F, and a weight sensor C which is usually made of a spring assembly with said force exerting terminal F arrested thereon. It is known that the weight sensor C actually serves as an intermediate means for transferring the sensed pressure to the pressure gauge D. The sensed pressure value can be learned from the display on the pressure gauge D. Although the above-stated scales have been welcomed by ordinary users, the mechanical structure connecting the weight sensor C to the gauge D is complicated.

SUMMARY OF THE INVENTION

It is therefore the principle object of the present invention to provide an improved scale having an oil pressure gauge provided therein for displaying the measured weight of an object or person.

Another object of the present invention is to provide an improved scale which includes an apparatus for intermediate transmission of the sensed oil pressure to the oil gauge in the scale.

A further object of the present invention is to provide a scale wherein the gauge is an oil pressure gauge as that disclosed in U.S. Pat. No. 4,040,298 which was issued to the same applicant of this application.

An important feature of the apparatus for intermediate transmission of the sensed pressure to the oil gauge according to the present invention resides in a retractable bellows envelope which is filled with hydraulic oil and made of a flexible material for sensing the weight of the load applied on the scale.

Another feature of the apparatus for intermediate transmission of sensed pressure to the oil gauge according to the present invention is an air leakage device provided on the envelope to prevent the entrance of air into the bellows envelope.

Still another feature of the present invention is a plurality of loop retainers provided at the inward bending portions of the zigzag wall of the bellows envelope for retaining the shape of the same and thus enabling a greater weight to be measured.

Accordingly, the apparatus for intermediate transmission of sensed oil pressure in a scale having an oil gauge provided therein for displaying the weight readings, comprises an envelope which is filled with hydraulic oil and is substantially in the shape of a bellows and made of a flexible material; a seat member having an annular flange for the connection of said envelope and also for the attachment to the casing of the scale, and also having an oil passage formed therein for communicating the oil in the envelope to an oil outflow conduit; and an air leakage means connected on the said envelope, having a first plate member and a second plate member clamping an end surface of said envelope with a screw positioned therebetween, said screw having an air passage formed therein, and a knob stopping said air passage.

BRIEF DESCRIPTION OF THE DRAWINGS

These and other objects, features and advantages of the present invention will become apparent from the following detailed description of the preferred embodiments with reference to the accompanying drawings, wherein.

DETAILED DESCRIPTION OF THE PREFERRED EMBODIMENTS

Figure 3:
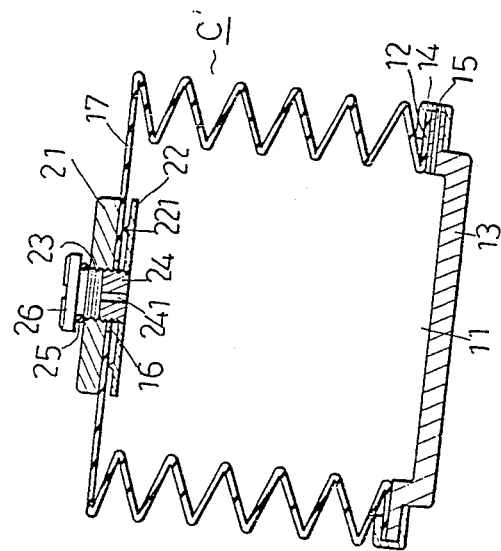
FIG. 3 is a sectional view of the apparatus for intermediate transmission of sensed oil pressure according to the present invention.
Figure 2:
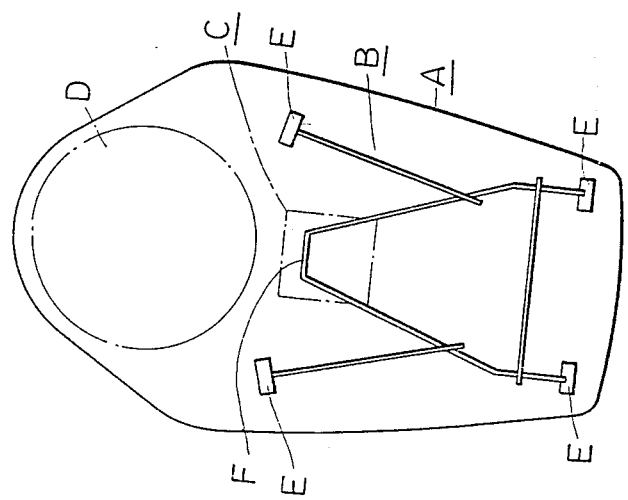
FIG. 2 is an, elevational schematic view of the scale in FIG. 1 for illustrating the interior construction thereof.

Referring to FIG. 3 which shows a sectional view of the apparatus for intermediate transmission of sensed oil pressure in a scale, the apparatus C' primarily includes a bellows-shaped envelope 1 which is made of a flexible material having an open end 11 and a sealed end 17 formimg a chamber for hydraulic oil to be filled therein. A substantially plate-shaped seat member 13 comprises an annular flange for the attachment of said envelope which is secured thereto by means of an annular clamp 14. The seat member 13 also comprises an oil passage 15 formed at the flange portion thereof for communicating the oil from the chamber of the envelope 1 to an outflow conduit 42 like that shown in FIG. 4. The passage 15 does not need to be equipped at the flange portion of the seat member 13 but can be equipped at other suitable locations on the seat member 13. An air leakage means 2 is provided at the sealed end 17 of said envelope 1. The air leakage means 2 includes a first plate member 21 placed on top of said sealed end 17 of the envelope 1, a second plate member 22 placed beneath said sealed end 17 of the envelope 1 abutting said first plate member 21, and a substantially screw-shaped air leakage member 24 having outer threads to connect said first and second plate members 21, 22. The air leakage member 24 has an air passage 241 axially formed therein. On one side of said second plate member 22, an annular protrusion 221 is provided for the purpose of the improved sealing of the sealed end 17 of the envelope 1 so as to prevent possible oil leakage. A knob 26 has a stem portion with threads formed on the outer surface thereof for engaging with the first plate member 21. The knob 26 does not need to be made of a metal and have a threaded stem, but can also be made of a flexible material such as rubber for blocking the air passage 241 of the air leakage member 24. When the knob 26 is made of a metal material, it is preferable that an O-ring be introduced between the first plate member 21 and the knob 26.

Figure 1:
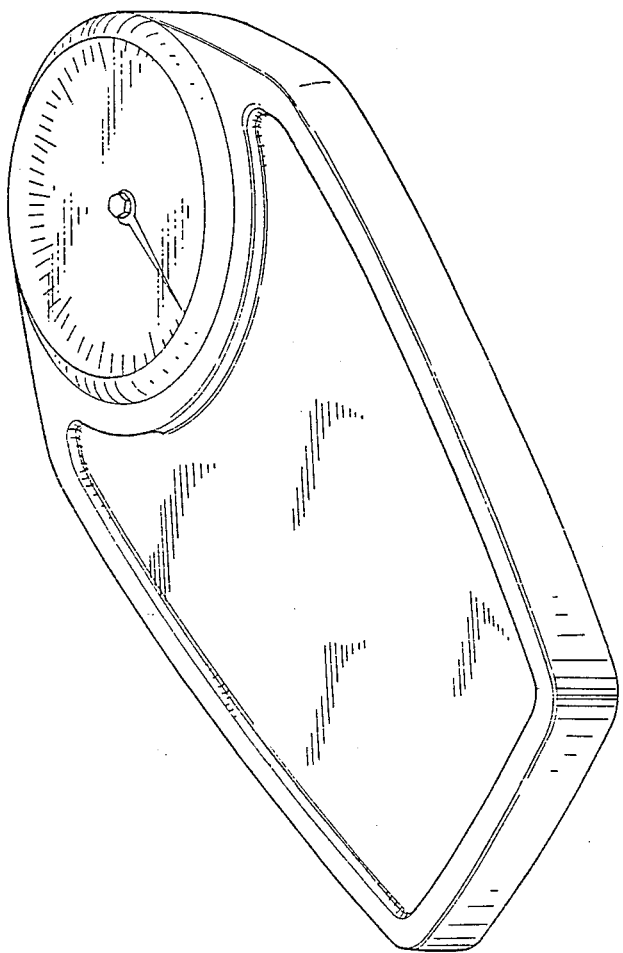
FIG. 1 is a perspective view of a scale for measuring the weight of an object or person.
Figure 4:
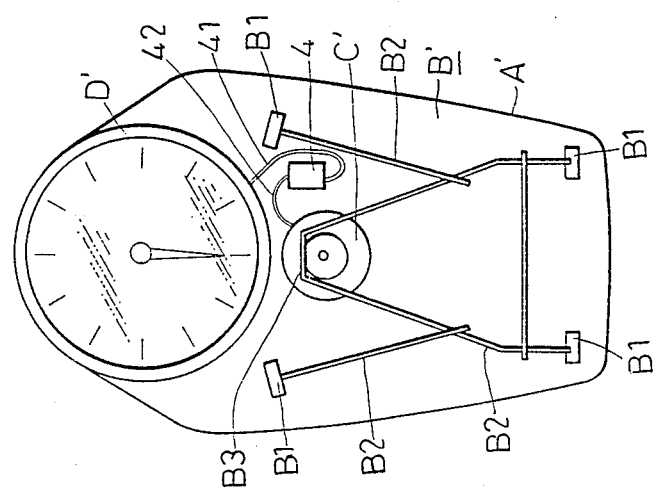
FIG. 4 is an elevational schematic view of a scale having an apparatus for intermediate transmission of sensed oil pressure provided therein.

Referring to FIG. 4, which is an elevational schematic view of a scale utilizing the apparatus for intermediate transmission of sensed oil pressure, the scale A' is like the conventional scale shown in FIG. 1 except that the apparatus for intermediate transmission of sensed oil pressure C' is provided therein. The scale A' includes an assembly of levers B' which further consists of levers B2 with fulcrums B1 and a force exerting terminal B3 resting on the first plate member 21 of the apparatus C'. An oil pump 4 is provided in the scale A' having an oil outflow conduit 42 connected to the oil passage 15 of the base member 13 of apparatus C', and another oil conduit 41 leading to the oil pressure gauge D'. As stated hereinbefore in the summary part of this patent specification, the oil gauge D' can be the type of gearless pressure gauge disclosed in U.S. Pat. No. 4,040,298 issued to the same applicant of this application. The disclosure of the pressure gauge according to said issued patent will not be detailed for the purpose of simplicity but should be included herein as part of the enabling disclosure of the present invention.

The assembly of the scale A', shown in FIG. 4, requires that the apparatus C' be assembled first. Referring to FIGS. 3 and 4 simultaneously, the air leakage means 2 is first installed onto the sealed end 17 of the envelope 1. The envelope 1 is then connected to the base member 13 by means of the clamp 14. The oil conduit 42 is then connected between the oil passage 15 on the base member 13 and the oil pump 4. Another oil conduit 41 is then connected between the oil pump 4 and the pressure gauge D'. Hydraulic oil is pumped into the chamber of the envelope 1 through the oil passage 15 while the air which originally existed in the chamber is forced to exit via the air leakage passage 241 of the air leakage member 24. The oil will be pumped until the entire chamber of the envelope 1 is filled and no air remains therein. The knob 26 is then installed onto the air leakage means 2 to form the sealed oil envelope 1 of the apparatus C'. The assembly of levers B' is then constructed so as to be placed into the casing of the scale A' with the force exerting terminal B3 reseting on the apparatus C'.

In operation, when an object is placed, or a person stands onto the scale A' of the present invention, the weight of the object or person will cause the force exerting terminal B3 to press against the apparatus C'. This pressure, representing the weight of the object or person to be measured, forces the envelope 1 to deform in a radial direction. Due to the flexibility of the envelope 1, the oil contained in the envelope 1 will be forced to flow out through the oil passage 15 on the base member 13 into the pressure gauge D'. This sensed pressure is led to the pressure gauge D' converted into the movement of an indicating arrow to display the weight readings of the object or person. In this way, the apparatus for intermediate transmission of the sensed oil pressure according to the present invention achieves its functions.

Figure 5:
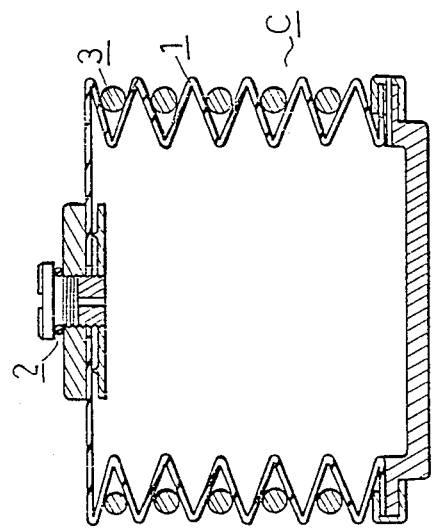
FIG. 5 is a sectional view of another embodiment of the apparatus for intermediate transmission of sensed oil pressure according to the present invention.

Referring to FIG. 5, which is a sectional view of another embodiment of the apparatus for intermediate transmission of sensed oil pressure according to the present invention, the apparatus has the exact same structure as that shown in FIG. 3, except that a plurality of retainers 3 are provided at each inward-bending position of the flexible envelope 1. The retainers 3 are made of rigid materials, preferably metals, in the shape of a ring. The retainers 3 are for the purpose of preventing the bellows-shaped envelope 1 from overly deforming in a radial direction. This will enable the scale having the apparatus for intermediate transmission of sensed pressure to be operated in a greater weight range. In addition, the linearity of the scale in measuring the weight loaded thereon will be much improved.

Although the apparatus for intermediate transmission of sensed pressure in a scale has been described by way of preferred embodiments, it is noted that changes and modifications are still possible for those skilled in the art without departing from the spirit of the present invention.

What is claimed is:

1. An apparatus used in a scale having an oil pressure gauge for displaying measured weight and for intermediate transmission of sensed pressure, comprising:
   a bellows-shaped envelope for containing hydraulic oil therein, made of flexible materials, having an open end and an sealed end respectively;
   a substantially plate-shaped base member having an annular flange formed on the peripheral portions thereof for connection to said open end of said envelope, and an oil passage formed therein enabling said hydraulic oil to flow out of said envelope;
   means for connecting said open end portion of said envelope to said base member;
   an air leakage means formed on said sealed end of said envelope having an air leakage passage for leading out the air originally existing in the envelope during the process of filling said envelope with hydraulic oil; and
   a knob for blocking said air leakage passage after said envelope has been filled with hydraulic oil.

2. An apparatus according to claim 1 wherein said means for connecting said open end portion of said envelope to said base member is an annular clamp.

3. An apparatus according to claim 1 wherein said air leakage means further comprises a first plate member, a second plate member located on and beneath said sealed end of said envelope respectively, and an air passage member with said air passage formed therein.

4. An apparatus according to claim 3 wherein said air passage member further comprises means for connecting said first plate member and said second plate member.

5. An apparatus as claimed in claim 3 wherein said second plate member beneath said sealed end of said envelope further comprises an annular protrusion formed thereon for preventing oil leakage.

6. An apparatus according to claim 1 wherein said knob further comprises a stem portion with threads formed thereon for engaging with said air leakage means.

7. An apparatus according to claim 1 further comprising a plurality of retainers positioned adjacent and outside of said bellows-shaped envelope for improving the linearity of the measurement operation.

8. An apparatus according to claim 7 wherein each of said retainers is a rigid ring sleeved onto said envelope at the concave portion thereof.

* * * * *